Patented Jan. 25, 1944

2,340,013

UNITED STATES PATENT OFFICE 2,340,013

METHOD OF MAKING HIGH SILICA GLASS

Martin Emery Nordberg and Harold Edward Rumenapp, Corning, N. Y., assignors to Corning Glass Works, Corning, N. Y., a corporation of New York No Drawing. Original application November 18, 1938, Serial No. 241,274. Divided and this application July 20, 1940, Serial No. 346,654

1 Claim. (Cl. 49—79)

In the prior Patent 2,106,744, issued February 1, 1938, to Harrison P. Hood and Martin E. Nordberg, there is disclosed a method of making a highly siliceous glass which comprises melting a glass, fabricating the same into a fixed shape, heat treating the shaped article to cause throughout its mass a molecular rearrangement resulting in the formation of two interdispersed compositions which, for lack of a more accurate term, are hereinafter referred to as phases. One phase is highly siliceous and substantially insoluble. The other is soluble in acids and is thereafter leached out leaving a highly siliceous, rigid, porous structure having the same shape as the initial article. The resultant article is thereafter fired to close the pores and form a vitreous transparent glass. Such glass has a silica content of over 93% and a thermal expansion coefficient from about $7 \times 10^{-7}$ to about $14 \times 10^{-7}$ or only slightly above that of pure vitreous silica. As shown in the patent, any coloring oxides or agents present in the initial glass are substantially removed during the process and the final glass is practically colorless.

The primary object of this invention is subsequently to alter the physical characteristics of such finished glass.

Another object is to alter the spectral characteristics of the glass without substantial change in heat resistance, thermal expansion coefficient and other properties thereof.

The above and other objects may be accomplished by practicing our invention which embodies among its features impregnating the porous article, after extraction of soluble constituents, with a metallic compound which is decomposable by heat, and thereafter firing it.

Another feature comprises treating the porous article with a solution containing a salt of a metal which will color glass or fluoresce therein and firing the article.

Another feature comprises incorporating such metal salt in a restricted portion of the article to form a colored design within the body of the glass as by printing or stamping a solution of the salt on the porous glass in the desired design.

In practicing our invention the article is fabricated in the usual manner from a glass containing 60% to 82% $SiO_2$, 20% to 35% $B_2O_3$, and 5% to 10% alkali oxide, the composition being governed by considerations set forth in the above mentioned patent. In these glasses alumina may be present in small amounts and its presence in amounts up to 4% in glasses of low silica content located near the center of the defined field is advantageous in facilitating the subsequent leaching of the glass.

The article is subjected to a heat treatment which comprises heating the glass at a temperature between about 525° and 600° C. for a time necessary to cause the required change in structure. As a result of the heat treatment the glass will become more or less completely separated or formed into two phases, one of which is very rich in boric oxide and alkali and is soluble in acids and the other of which is very rich in silica and is substantially insoluble in acids. In other words, a change has taken place in the structure of the glass so that the constituents other than silica are for the most part soluble in acids and may be extracted thereby.

The previous thermal history of a glass has a bearing upon the heat treatment which may be required for best results. Articles which are relatively thick receive some heat treatment in normal working and cooling and the additional heat treatment required may be different from that required by a thinner article which was cooled more quickly during manufacture. Hence the term "heat treatment" as used herein includes heat treatment during fabrication as well as any additional heat treatment following fabrication.

In order that the leaching step may be carried out with better facility it is desirable, particularly in the case of pressed ware, to etch off the surface of the glass by immersing it for a few minutes in a dilute solution of hydrofluoric acid or in a hot 5% sodium hydroxide solution.

The article is then rinsed and immersed in dilute hydrochloric, nitric, or sulfuric acid, the temperature of the bath being held preferably at or near its boiling point to obtain maximum speed of extraction. The progress of the extraction may be observed because the interface between the extracted and unextracted portions of the glass is visible. Instead of carrying the extraction to completion, it may be stopped when any desirable depth has been reached by removing the article from the acid bath.

After the acid treatment the glass is washed to remove all traces of the soluble constituents which have been acted on by the acid. This is best accomplished by immersing the glass for several hours in pure running water so as to expose all sides of the article to the washing action. The removal of the soluble phase leaves the silica phase as a rigid structure possessing the original shape of the article, but submicroscopically porous, the pores being filled with water.

We have discovered that metal salts or compounds can be introduced in a uniform distribution throughout the pores or confined to a limited portion thereof after which the article can be dried and fired to close the pores and produce a non-porous, vitreous glass article having the shape of the initial glass article though somewhat smaller in size and having, in those portions containing the metal, a selective spectral transmission or color. If the whole article is to be colored, this is best accomplished by immersing the washed porous article in a solution of the desired metal salt for a time sufficient to permit the salt solution to diffuse into the pores. An immersion for two hours was sufficient for complete diffusion into a slab of the porous material one-eighth inch in thickness. This diffusion was about ten times as rapid when a previously dried porous sample was used. If it is desired to restrict the area of the glass to be colored as for the purpose of forming a design, the article is first dried and the metal salt solution is then applied in the desired design by means of a brush or a stamp or a silk screen or the like. For this purpose the viscosity of the solution may be increased by the addition thereto of a viscous liquid such as glycerine.

After the porous glass has been impregnated with the metal salt, it is dried by evaporating from the pores the solvent in which the metal salt was dissolved. In doing this, a moderate heat may be employed, but care should be exercised against expelling the solvent too rapidly because an explosive evolution of the vapor may cause the article to spall or crack. After drying, the temperature is increased to 900° C.–1150° C. where it is held for a short time after which the article may be cooled as rapidly as desired.

Our researches show that practically any colored cation can thus be introduced into the pores and the article thereafter fired to a non-porous colored glass. It has further been found that for a given firing temperature, if an excessive amount of the metal salt is used, the resulting colored glass will not be transparent but will be a colored opal glass, that is, will have light diffusing characteristics. The higher the maximum temperature at which the article is fired, the greater the amount of metal salt that must be introduced to cause opalescence. Articles having a shape which permits their being supported against warping or deforming may be fired at temperatures as high as 1300° C., while articles which are subsequently worked in a flame may attain temperatures above 1500° C. The amount of the salt which is absorbed is easily controlled by varying the concentration of the salt in the solution into which the porous glass is immersed. The maximum concentration which will produce a transparent colored glass will not only depend upon the temperature of firing but will vary with salts of different metals and will vary also with different salts of the same metal. For example, when small plates of a porous glass, prepared by the above described method from a glass of the initial composition 62.5% $SiO_2$, 6.6% $Na_2O$, 27.5% $B_2O_3$ and 3.4% $Al_2O_3$, were immersed for 24 hours in water solutions of metallic salts and thereafter fired at 1150° C., the following table shows the maximum concentrations in weight percent of the respective salts which produced a transparent colored glass and also the corresponding concentrations in terms of the oxides of the respective metals and the color of the resulting glass.

| Metal salt | Concentration, per cent by weight | Equivalent as oxide | Color of glass |
|---|---|---|---|
| $Cu(NO_3)_2 \cdot 3H_2O$ | 9 | 2.97 $CuO$ | Olive green. |
| $Fe(NO_3)_3 \cdot 9H_2O$ | 5 | .99 $Fe_2O_3$ | Reddish orange. |
| $Ni(NO_3)_2 \cdot 6H_2O$ | 3 | .77 $NiO$ | Rose. |
| $Co(NO_3)_2 \cdot 6H_2O$ | 10 | 2.58 $CoO$ | Blue. |
| $CoCl_2 \cdot 6H_2O$ | 12 | 3.78 $CoO$ | Do. |
| $Cr(SO_4)_3 \cdot 15H_2O$ | 3 | 1.26 $Cr_2O_3$ | Yellowish green. |
| $CrO_3$ | 1.3 | 1.0 $Cr_2O_3$ | Do. |

From the above it will be noted that not only do the concentrations of the solutions in terms of oxide vary with respect to the metal employed but, also, as is shown in the cases of cobalt and chromium, the oxide concentrations vary with respect to the particular salt of the metal. This phenomenon is not understood, but is believed to be caused by a selective absorptive effect of the anion of the respective salts. The above recited maximum concentrations for producing transparent glasses at a firing temperature of 1150° C. are increased somewhat when a firing temperature of 1300° C. is employed. For example, the maximum concentration of nickel nitrate for a firing temperature of 1300° C. is about 10% by weight, for copper nitrate a little over 13%, for cobalt nitrate over 12%, for cobalt chloride 13%, for ferric nitrate over 15%, etc. The color or hue which is produced by a given metal in the finished product is substantially the same whether the nitrate, chloride, or sulphate is used. The color saturation or density varies directly with the concentration of the coloring ion. In other words, various salts of the same metal will produce substantially the same hue but the saturation or density of the color will decrease as the solutions are made more dilute. The chromium compounds, $CrO_3$, $NH_4Cr(SO_4)_2$, $Cr_2(SO_4)_3$, $NH_4CrO_4$, and $CrCl_3$ in water solutions containing each an amount of the respective salt equivalent to 1% by weight of $Cr_2O_3$, produced each substantially the same hue in porous glass plates treated therewith and fired.

The porous glass may also be treated in a solution containing a combination of two or more metal salts and thereafter dried and fired to produce a glass colored by the combination of metals. For example, pieces of porous glass were treated with solutions containing both copper nitrate and cobalt nitrate. The resulting colors were different from those produced by either copper alone or cobalt alone. The ratio of copper to cobalt determines the particular hue which is obtained.

The glasses resulting from treatments with the solutions shown in the above table are all transparent but with solutions of these salts in concentrations greater than above set forth the resulting glasses will be opal and will have light diffusing characteristics. For some purposes light diffusing characteristics are desirable, but if it is desired to obtain a greater saturation or density of color than can be obtained with the above recited maximum concentrations, we have found that this can be accomplished by introducing into the glass along with the metal salt solution a solution of another salt or compound, hereinafter called clearing agent, which has the effect of increasing the amount of metal salt that can be introduced without causing opalescence. The number of compounds which have a clearing effect is very limited and we have found that aluminum nitrate, phosphoric acid, and alkali salts possess this property in substantial degree. Presumably other salts of aluminum will also be effective and we have found that alkali phosphates, such as sodium dihydrogen phosphate, are very efficient. The presence of $P_2O_5$ in the glass may also have an effect on the ultimate color. It tends to bleach the color of iron and it causes a change in hue of the colors produced by nickel and cobalt. Alkali salts in general tend to cause devitrification and spalling of the glass on firing due to the tendency of such salts, when too concentrated, to creep or come to the surface on drying. The following experiment illustrates the effect of aluminum nitrate and phosphoric acid as clearing agents.

Three plates of the above described porous glass were treated as follows:

One was immersed for 24 hours in a water solution containing 10% by weight of

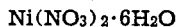
$Ni(NO_3)_2 \cdot 6H_2O$ and was thereafter dried and fired at 1150° C. After firing, this sample was a dense opal.

The second sample was immersed for the same length of time in a water solution containing the same percentage of nickel nitrate and containing also an amount of $Al(NO_3)_3 \cdot 9H_2O$, equivalent to 5% by weight of $Al_2O_3$, and was thereafter fired at 1150° C. After firing, this sample was transparent and the color density was considerably greater than that produced by the maximum concentration recited in the above table.

The third sample was immersed for the same length of time in a water solution containing the same percentage of nickel nitrate and containing also an amount of $H_3PO_4$, equivalent to 5% by weight of $P_2O_5$, and was thereafter fired at 1150° C. After firing, this sample was transparent and although the color saturation was greater than that of the maximum concentration of the above table the hue was different, being in this instance a bright amber yellow.

Subsequent analysis of the samples showed that the first contained .42% NiO, the second contained .56% NiO, and the third contained .41% NiO, thus demonstrating that the effect of the aluminum salt or the phosphoric acid was not to reduce the amount of nickel ion adsorbed by the porous glass but to exert some specific clearing action.

If porous glass articles after treatment with a metal salt solution are fired in a reducing atmosphere, unusual color effects can in some cases be obtained. Under strong reduction most metal salts in such glasses are reduced to metal and give the glass a smoky black appearance. Some metals, however, produce a useful and unique coloration. For example, a glass that has been treated with a solution of a molybdenum salt, when fired in an atmosphere of hydrogen, becomes a lustrous, glossy, opaque black throughout its mass. A glass treated with a vanadium salt and fired in hydrogen takes on a beautiful sky blue hue.

If desired, the absorption or introduction of the metallic salt solution into the porous glass can be confined to any particular area of the article to produce therein any desired design. This is accomplished by increasing the viscosity of the solution by the addition of a viscous liquid such as glycerine and applying the viscous solution to the selected areas by means of a brush or a stamp. The well known silk screen process may also be employed for this purpose. Best results are obtained by first drying the porous glass before the application of the solution. In this manner various intricate designs and decorations may be formed within the surface of the article in which several colors may appear due to the successive application of different metal salts. An article may thus be produced which is of one color on one face and a different color on its other face.

Glasses which have been prepared in accordance with the above described method show the characteristic fluorescence of the metal which was introduced when such glasses are irradiated with ultraviolet light and other exciting radiations. It will thus be seen that fluorescent screens can be prepared in which intricate multicolored designs can be caused to change intermittently in color and appearance by alternately transmitting visible and ultraviolet light therethrough.

This application is a division of our pending application Serial Number 241,274, filed November 18, 1938 which issued December 1, 1942, as Patent No. 2,303,756.

We claim:

The method of making a glass article, which comprises melting a glass, fabricating the same into a fixed shape, heat treating the article to render constituents other than silica soluble, dissolving out major quantities of the said other constituents to leave a highly siliceous, substantially transparent, porous article, treating the porous article with a solution containing a salt of a metal which will color glass and containing also an aluminum salt to impregnate the article therewith, and firing the article to close the pores and incorporate the metal into the glass.

MARTIN EMERY NORDBERG.
HAROLD EDWARD RUMENAPP.